US012656205B2

(12) United States Patent
Schulte et al.

(10) Patent No.: US 12,656,205 B2
(45) Date of Patent: Jun. 16, 2026

(54) GAS MONITORING SYSTEM AND METHOD(S) OF USE

(71) Applicant: High Resolution Data, LLC, Centennial, CO (US)

(72) Inventors: William Schulte, Centennial, CO (US); Gary Cook, Monument, CO (US)

( * ) Notice: Subject to any disclaimer, the term of this patent is extended or adjusted under 35 U.S.C. 154(b) by 675 days.

(21) Appl. No.: 18/176,788

(22) Filed: Mar. 1, 2023

(65) Prior Publication Data

US 2023/0314261 A1     Oct. 5, 2023

Related U.S. Application Data

(60) Provisional application No. 63/418,843, filed on Oct. 24, 2022, provisional application No. 63/325,529, filed on Mar. 30, 2022.

(51) Int. Cl.
*G01M 3/04* (2006.01)
*G01N 1/22* (2006.01)

(52) U.S. Cl.
CPC ............ *G01M 3/04* (2013.01); *G01N 1/2273* (2013.01); *G01N 2001/2291* (2013.01)

(58) Field of Classification Search
CPC ..... G01M 3/04; G01N 1/2273; G01N 1/2205; G01N 1/26
See application file for complete search history.

(56) References Cited

U.S. PATENT DOCUMENTS

2021/0348988 A1*  11/2021  Johnson .................... E21F 7/00
2022/0091026 A1*   3/2022  Scott ...................... G01P 13/045

* cited by examiner

*Primary Examiner* — David Z Huang
(74) *Attorney, Agent, or Firm* — Leyendecker & Lemire, LLC

(57)     ABSTRACT

A gas monitoring system and method(s) of use is described. Embodiments of the gas monitoring system can include a gas detection system and one or more tubing assemblies. The gas detection system can be configured to determine if sampled air contains a particular gas or gases. The one or more tubing assemblies can be fluidly connected to the gas detection system to provide air from an area to be monitored. The one or more tubing assemblies may include a dynamic tubing assembly configured as a vane.

17 Claims, 7 Drawing Sheets

GAS MONITORING SYSTEM AND METHOD(S) OF USE

CROSS-REFERENCE TO RELATED APPLICATION

This application claims the benefit of U.S. Provisional Application No. 63/418,843, filed Oct. 24, 2022 and U.S. Provisional Application No. 63/325,529, filed Mar. 30, 2022.

BACKGROUND

Production and distribution in the oil and gas industry can emit methane gas through unintended (or fugitive) leaks in operational equipment including wellhead connections, pipes, storage tanks, and compressors. More specifically, unintentional leaks from pressurized equipment used in oil and gas operations can lead to gas being released to the atmosphere. Methane emissions from leaks in equipment are mostly caused by imperfections or ordinary wear in sealed joints such as flange gaskets, screwed connections, valve-stem packing, seats on pressure relief valves, tank lids, or poorly seated open-ended valves.

Of note, methane gas has been identified as a significant contributor of greenhouse gases that have been identified by climate scientists as harmful to the planet. As such, both private and governmental regulations are being mandated which require operators to reduce leakage by monitoring facilities and equipment. Once leaks are detected, maintenance personnel can be summoned to mitigate the leakage as defined by leak detection and repair (LDAR) surveys.

Currently available methane gas monitoring methods include the use of a dedicated point gas detection sensor near potential fugitive emissions. Oil and gas production sites have multiple areas for potential methane gas leaks and thus a plurality of detection instruments are required. Additionally, wind direction and velocity can prevent detection from a point sensor located up wind of a leak unless the area is surrounded by multiple point sensors. Another method requires one or more (typically many) perimeter methane gas monitoring stations that rely on leaked gas to "drift by." Due to the distance from methane leak and the dilution with air, these systems rely on highly sensitive gas detection sensors along with meteorological information and complex computer algorithms to determine the severity and location of a gas leak. Yet other methods include remote satellite imaging and spectroscopy, drive by camera infra-red measurement, and other similar methods that are inherently intermittent and prone to possible long periods between leak and detection.

An effective methane monitoring system with low cost per sensing point location of methane detection that incorporates a methane detection means remotely located away from potentially hazardous areas in an oil and gas operation with one or more tubing assemblies fluidly connected to the methane detection system and providing air samples from proximate potentially leaking equipment to the methane detection means is needed.

DETAILED DESCRIPTION

Figure 1:
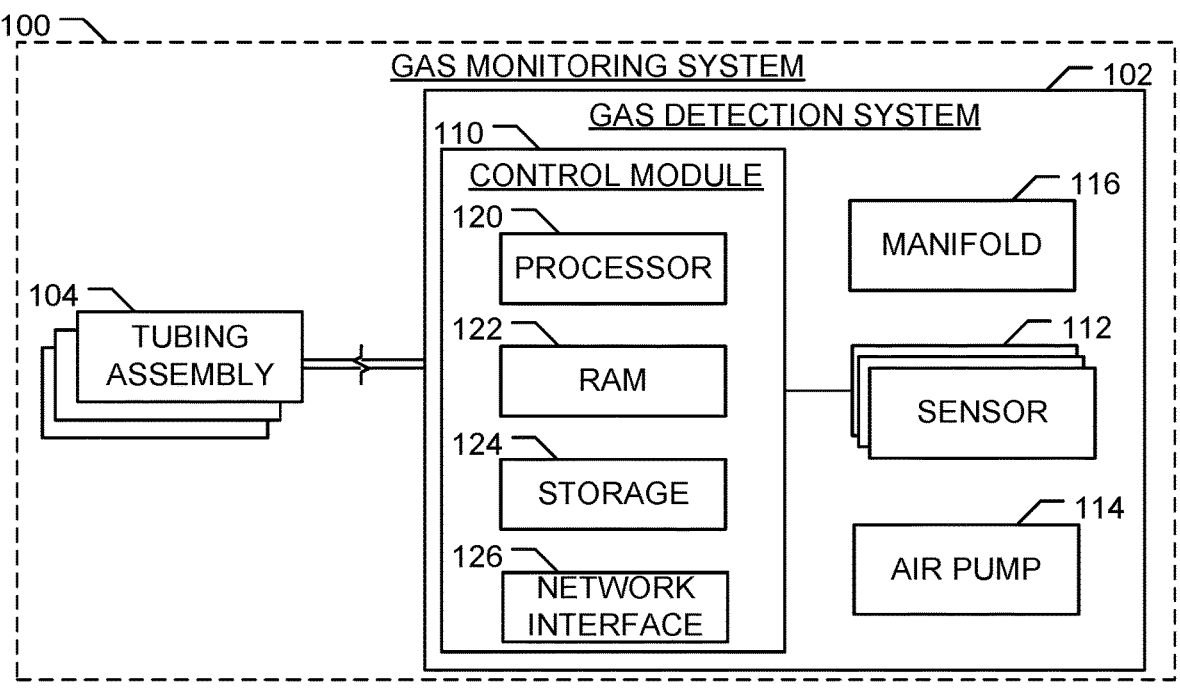
FIG. 1 is a block diagram of a gas monitoring system according to one embodiment of the present invention.

Embodiments of the present invention include a gas monitoring system and method(s) of use thereof. The gas monitoring system can be implemented in several different fields including, but not limited to, oil and gas operations, agricultural operations, and other areas. For instance, the gas monitoring system can be implemented to monitor methane in an agricultural operation. In another instance, the gas monitoring system can be implemented to monitor $CO_2$ emissions from carbon capture injection sites and volatile organic compounds (VOCs).

In one embodiment, a gas monitoring system can include, but is not limited to, a gas detection system and one or more tubing assemblies. The gas monitoring system can be implemented to detect gases in samples provided by the one or more tubing assemblies. The one or more tubing assemblies can be fluidly connected to the gas detection system and can be implemented to provide samples from areas to be monitored. Of note, the one or more tubing assemblies can each be configured for a specific location. For instance, a tubing assembly may be configured with several intakes provided above and around an area to be monitored. The tubing assemblies may be referred to as "sampling tubing".

In one example, the gas monitoring system can be implemented to detect methane for an oil and gas (oil/gas) operation. As can be appreciated, the described embodiments hereinafter can be altered and/or modified to detect gasses different than methane. The methane monitoring system can be an economical and practical system and method for continuous methane gas leak detection on an active oil/gas site. In one embodiment, the methane monitoring system can include a multi-zone methane detection system for monitoring methane and fugitive emissions using aspirating pipes (sampling tubing) and a single high sensitivity methane sensor. In another embodiment, the methane monitoring system can include a multi-zone methane detection system for monitoring methane fugitive emissions using multiple aspirating pipes (sampling tubing) and two or more high sensitivity methane sensors. The methane monitoring system can be capable of detecting methane gas and can include a methane detection system and one or more tubing assemblies fluidly connected to the methane detection system. The methane detection system can be configured to store collected data via a control module and can wirelessly communicate with a user.

In one embodiment, the gas monitoring system can include a means for detecting methane and one or more tubing assemblies fluidly connected to the methane detecting means. Typically, the means for detecting methane can be located in a non-hazardous area and the one or more tubing assemblies can be located proximate equipment that may (or could) be leaking methane. Of significant note, the tubing assemblies can include no components that need to be hazardous area certified to be located proximate the equipment.

In one embodiment, a methane monitoring system can include, but is not limited to, a methane detection system and one or more tubing assemblies. The methane monitoring system can be implemented to detect methane in samples provided by the one or more tubing assemblies. The one or more tubing assemblies can be fluidly connected to the methane detection system and can be implemented to provide samples from areas proximate equipment in an oil/gas operation. Of note, the one or more tubing assemblies can be configured for specific equipment on an oil/gas operation. For instance, a tubing assembly may be configured for an oil/gas wellhead with an intake provided above and around the oil/gas wellhead. Embodiments of the present invention include specifically designed tubing assemblies configured to maximize methane detection of equipment commonly found at oil/gas operations.

In one example implementation of a methane monitoring system in an oil/gas operation, one or more tubing assemblies can be located in a plurality of zones along with the methane detection system being located in a safe zone away from equipment located in the oil/gas operation. In such an instance, the methane detection system may include a manifold valve header to alternate testing from each of the zones.

In another example implementation of a methane monitoring system in an oil/gas operation, one or more tubing assemblies can be located in a plurality of zones along with the methane detection system being located in a safe zone away from equipment located in the oil/gas operation. In this instance, multiple air pumps can be implemented in place of a manifold valve header. The air pumps can be in an enclosure with each pump receiving a tubing assembly from different zone being monitored. The air pumps can be sequentially activated and their air outputs can all be brought into a single methane sensor. The air pumps can include back flow prevention that does not allow for output air to exit through them. As can be appreciated, when the air pumps are not pumping, yet the outputs of each of the air pumps are all tied to a single methane sensor enclosure, the outputs do not bleed air back through the non-active pumps. Of note, this configuration can allow for the same feature as a valved header inlet but without the use of expensive and fault prone electronic valves.

In one embodiment, a methane monitoring system can include a plurality of methane detection systems with each of the plurality of methane detection systems being fluidly coupled to one or more tubing assemblies. For instance, at a very large oil/gas site, multiple methane detection systems can be located around a perimeter (e.g., in a safe area) of the oil/gas site. The plurality of methane detection systems can be in communication with one another. In some instances, tubing assemblies from different methane detection systems can be located proximate the same equipment as a backup in-case one of the methane detection systems incur a failure. Each of the plurality of methane detection systems can include the one or more tubing assemblies to provide monitoring to equipment in the oil/gas site.

Listed hereafter are examples of tubing assembly designs for use near equipment located in an oil/gas operation. Generally, the tubing assemblies can be located proximate a wellhead in an oil/gas operation. In most instances, a tube can be operatively connected to the methane detection system in a safe zone and run (or be routed) to the wellhead (or other equipment location). In one example, a portion of the tube can raise up vertically above the wellhead. Four tubes fluidly connected to the vertically extending tube can then extend out from the vertical tube in different directions. As can be appreciated, this can help ensure that a potential methane leak can be detected even when the wind is blowing. In another example, the tubing can be wrapped around the wellhead in a coil. By encircling the wellhead, the tubing assembly can increase a likelihood of detecting a methane leak. In yet another example, four different tubes can extend vertically up around the wellhead. The four tubes can generally be in a square to help ensure that methane can be detected even when the wind is blowing. In one example where the tubing assembly may be located proximate a pumpjack, the tubing can be in a circle surrounding a portion of the pumpjack to help detect any methane leaks. In some instances, the tubing can be draped directly onto a piece of equipment similar to draping Christmas lights on a tree. In other instances, the tubing can emanate from a central multipoint header to help determine more specific leak point locations.

Embodiments of the present invention can include a tubing design that may implement gas inlets along a length of the sampling tubing. The inlets can be integrated within the tubing at predetermined intervals. Each gas entry inlet can include a dust and debris filter made with a breathable hydrophobic or waterproof material (e.g., GORETEX® or a similar filter material). In some instances, patches of waterproof filter material can be applied over perforations along the tubing. The gas entry inlets can also be made up of individual tee fittings along the tubing. Each tee fitting can include a dust and debris filter made with a waterproof material (e.g., GORETEX® or similar filter material). Long lengths of tubing with multiple gas inlet locations can be run along potential leak areas to provide samples from those areas to the methane detection system. For instance, the sampling tubing can be placed proximate tank gangways, large compressor stations, and may even be wrapped around objects on an oil/gas site (e.g., a wellhead). In one instance, the gas inlet tubing sections can be part of a continuous loop of non-perforated tubing to cover wide areas.

Embodiments of a dynamic tubing assembly are contemplated that implement a wind vane configuration. The wind vane can be constructed with an angled sensing input such that the wind vane can direct wind into a sensing inlet. For example, a cup shaped member can be located on a distal end of the wind vane with the sensing input located in an interior of the cup. As can be appreciated, as the wind blows, the distal end of the wind vane can rotate with the wind direction and the cup member can direct air to the sensing input. The wind vane configuration can generally have a shortened arm designed to direct wind into a sensor specifically orientated to catch gas(es) contained in the air. Generally, a protrusion (or tail) can be mounted on a rotating arm at an opposite end of a rotational pivot point causing the end of the rotating arm to be located downwind.

In one embodiment, a dynamic tubing assembly can include, but is not limited to, a main extension member, a rotating arm, a protrusion, and a sensing means. Of note, the dynamic tubing assembly can be operatively connected to a gas detection system. The dynamic tubing assembly can be implemented to provide an efficient gas sensing means. Typically, one or more dynamic tubing assemblies may be placed around a perimeter of a monitored area. One or more known means for creating a rotating (or pivoting) connection between the main extension member and the rotating arm can be implemented. Embodiments are contemplated where electrical and/or mechanical means can be used to create the rotating connection. In one example, the rotating component may be an electrical signal commutator device. In another example, a rotating air joint can be implemented when tubes with inlets for aspirating the environment are used.

In one embodiment, the dynamic tubing assembly can include a main extension member, a rotating arm, a protrusion extending radially from the rotating arm, and a sensing means located proximate an end of the rotating arm. The main extension member, the rotating arm, and the protrusion can be configured as a vane. The rotating arm can extend out perpendicular to the main extension member and can be rotatably coupled to the main extension member. When the wind is blowing, the rotating arm can be configured to rotate and align the sensing means in a direction that the wind is blowing. Of note, a gas detection sensor or an aspirating inlet can be implemented as the sensing means and can typically be located near an end of the rotating arm. In one instance, the rotating arm may have an electrical wire to bring a signal from the gas sensor to a control module having storage capabilities. In another instance, an inlet with a filter fluidly connected to a gas detection system can be mounted to an end of the rotating arm.

In one instance, the rotating arm can be made from hollow tubing and include one or more inlets adapted to aspirate (sniff) the atmosphere where the inlets are located in the tubing and into a remotely located gas detection system. Of note, an additional inlet port located near a top of the main extension member can be beneficial when there is no wind and the gas is predominately rising. In instances where gas sensors are implemented, an additional sensor may be needed near a top of the main extension member. As can be appreciated, any number of sensors can be attached along the rotating arm at any desired interval spacing. During conditions of moving air (e.g., wind), the implementation of a wind vane configuration can allow the dynamic tubing assembly to be positioned in the direction of the moving gas stream. In some instances, a vertical position of the dynamic tubing assembly can be fixed at an expected optimum height.

In another embodiment, a dynamic tubing assembly can include, but is not limited to, a main extension member, a rotating arm, a protrusion, a second extension member, and a plurality of sensing means (e.g., sensors or inlets). The dynamic tubing assembly can be constructed similar to the first example embodiment dynamic tubing assembly. In one instance, the second extension member can be located on a distal end of the rotating arm and can extend downwards perpendicular to the rotating arm. In another instance, the second extension member can be located on a distal end of the rotating arm and can extend upwards perpendicular to the rotating arm. In yet other instances, the second extension member may extend out at an angle between 1-90 degrees from the rotating arm in an upwards or downwards direction. The second extension member may be constructed of either rigid or flexible tubing. The plurality of sensing means can be located along a length of the second extension member. As can be appreciated, the plurality of sensing locations can increase the probability that leaking gas will be sensed. Of note, a length of the second extension member and number of sensing locations can be determined based on a particular wellhead (or other equipment) being monitored.

In some instances, an embodiment can be constructed to sense an actual wind direction. A wind direction determination means can be implemented with the previously described gas detection systems. In one instance, a wind vane configuration can be modified with an electrical position encoder, an electrical resistance potentiometer, or anything capable of indicating the vane position and can provide actual wind direction. As can be appreciated, information from the wind direction determination means can be useful in the analysis of a leak location. The wind direction determination means can save installing a separate wind vane and the associated costs. A wind speed indicator anemometer may also be an integral component embodiment of the invention.

Numerous technical and cost saving benefits can be derived from embodiments of the gas monitoring system. First, an economical measurement at a variety of specific locations is possible. Second, usually only a single high sensitivity and quality gas (e.g., methane) sensor is required. Third, tubing assemblies that can sample specific zones or locations eliminate costly individual single point methane detection sensors to be distributed across a location. Fourth, locations are typically in a classified explosive hazardous area requiring any electronic instrumentation to be certified and commonly housed in explosion proof enclosures. By implementing sampling tubing that is passive and has no active mechanical elements or electricity present, the system is safe and no expensive certifications or enclosures may be required. Fifth, sampling tubing is passive and has no active components, wires, wireless schemes, or batteries for operation. Sixth, reliability is high with a passive sampling system. More specifically, only tubing with inlet port filters are routed and attached to monitored locations. Sixth, all detection can be done inside a common detection enclosure which can be readily serviced, battery operated, and solar powered. Seventh, gas sampling entry points along the tubing can be individually tested.

In one embodiment, a gas monitoring system (e.g., for methane detection) using aspirating pipes (e.g., tubing with inlets) designed for multiple zones to be sampled by a single high-sensitivity methane sensor and a single air pump is contemplated.

In another embodiment, a gas monitoring system (e.g., for methane detection) using aspirating pipes (e.g., tubing with inlets) designed for multiple zones to be sampled by multiple high-sensitivity methane sensors with a single air pump is contemplated.

Embodiments of the sampling tubing can have multiple gas inlets at pre-determined intervals along a length of the tubing. Typically, the gas inlets can include a custom dust, water, ice, debris, etc. filter made with breathable waterproof (hydrophobic) material (e.g., GORETEX®). The sampling tubing can be configured to be shape configurable for specific target monitoring points. For instance, the tubing can be configured for individual pieces of equipment as well as a specified area to be monitored. The specified area can include, but may be limited only by an entire gas product and processing infrastructure, whole well-pads, wellheads, compressors, liquid tanks, and fluid exchange buildings. The sampling tubing can be shape configurable (i) for reducing wind interference and maximizing leak detection, and (ii) in zones to allow reliable location and identification of leaks. In some embodiments, the sampling tubing can be designed for time of flight to permit spatial correlation between multiple zones (e.g., adjustment of hole size, location, and total flow). In other instances, the sampling tubing can be designed for time of flight to permit spatial correlation between multiple zones with the express purpose of reducing false positives. In one embodiment, a unique air drier/dust filter system can be implemented at a tubing entry point of the methane sensor enclosure.

Of note, large areas can be monitored by implementing sampling tubing on a perimeter of an oil/gas site. As can be appreciated, an exact object (e.g., piece of equipment) that may be leaking can be extremely difficult to determine. In some instances, computer algorithms can be used to determine location as best as possible. Individual sampling tubing lines can be used to sample from a zone and send back an air sample to the gas detection system where each zone can be ported through electronically controlled valves to a gas (e.g., methane) sensor. Cost savings can be achieved due to elimination of the expense of multiple costly monitoring devices.

As can be appreciated, sensors and transmitter devices are expensive and require maintenance. Monitoring an object like a wellhead or a single tank for emissions can require multiple sensing positions due to localized air movement caused by wind. Embodiments of the present invention provide a cost-effective alternative which can implement a single sensor detection system that can be provided air samples through a tubing conveyed aspirator arrangement. Air samples can be channeled through tubing via an air pump adapted to create a suction vacuum. The air samples can be presented to a gas detection sensor. The gas monitoring system can help ensure that even when the wind blows in any direction, a gas leak can still be detected.

As can be appreciated, prevailing winds can be a real problem. The gas monitoring system can be configured to pick up air samples regardless of which direction the gas is headed and then brought together in a single tube fed into the gas detection system. A major safety advantage comes from the fact that only measured air is drawn into tubing and is in essence a passive device. No electrical energy is involved in the measurement inside a hazardous area. The gas sensor can be placed far enough away in a safe area while the tubing can be located proximate an area to be monitored. In some instances, the gas detection system can include a flame arrester and/or incorporate an ignition safe gas sensor and ignition safe air pump.

In one embodiment, multiple runs of tubing can be brought back to the gas detection system and the respective lines can be multiplexed through a valve header manifold arrangement through to the gas sensor. In another embodiment, multiple gas sensors can be implemented to test each run of tubing independently.

Embodiments are contemplated that implement one or more dynamic tubing assemblies in the methane detection system. The dynamic tubing assembly can include a vane configuration wherein one or more sensing means are integrated into a rotating arm that moves with the wind. As can be appreciated, the sensing means can be moved into a location where wind is blowing thus enhancing the chance of detecting any leaks.

Typically, calibration using methane gas can be introduced at the air entry points and observed back at the detection system for sensitivity, accuracy, and time of flight. Open or pinched lines can be determined through periodic testing. In practice, durable plastic and stainless-steel sampling tubing is available in single lengths or longer lengths on reels and drums. Where stainless steel tubing is implemented, filtered sampling inlets along the tubing can be made with Swagelok® fittings. In another instance, where plastic tubing is implemented, stab-in barbed tee connections can be implemented for the filtered sampling inlets. Additionally, integral gas inlet port filters can be manufactured into the tubing. Long tubing runs from the gas detection system to sensing locations can be trenched and buried for protection. Gas sampling inlet ports can be mounted directly near potential leak sources or even high overhead for area wide sampling. In instances where the tubing is mounted high overhead, the tubing can then be out of the way of operation workers and provide protection against adverse environmental conditions. Of note, methane gas is lighter than air and will rise so a good measurement may be up high above a potential leaking source.

Typically, when a leak is detected (e.g., a gas sensor detects a particular gas), the gas detection system can be configured to send an alert to a remotely located device. The determination of whether conditions have been met to send an alert (or alarm) can initially be made by the control module of the gas detection system. The detection of a monitored gas can be logged (e.g., stored) and transferred to an online monitor or dashboard through a network interface. Of note, additional conditions may be applied to determine where the alert should be sent. For instance, depending on a severity of the leak, the alert may be sent to different people. An alert can be forwarded to selected individuals/locations via text, email, phone, and/or visual means on a dashboard. Of note, alarm status can be available both in real-time and historical form. It is also possible to view alarm status locally through a WIFI connection which can be valuable during setup and testing. Alarms can include, but are not limited to, high methane detection (e.g., leaks, watch levels) and failure conditions (e.g., sensor out of range, plugged line, low battery voltage, temperature, etc.). Of note, the conditions (or parameters) for when to send an alert can be adjusted based on the gas being monitored. In one example, the actual response to these conditions can be configured and Boolean operations can be applied. Of significant note, a robust alarm capability of the gas detection system can allow for a rapid focused response to leaks while minimizing false positives.

The present invention can be embodied as devices, systems, methods, and/or computer program products. Accordingly, one or more components of the present invention can be embodied in hardware and/or in software (including firmware, resident software, micro-code, etc.). Furthermore, one or more components of the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

The term "hazardous zone," as used in this specification and the appended claims, refers to areas, locations, and/or spaces at an oil/gas site where fire or explosion hazards may exist due to flammable gases, vapors, and/or liquids.

The term "safe zone," as used in the specification and the appended claims, refers to areas, locations, and/or spaces at an oil/gas site where the risk of fire or explosion hazards are minimal and electrical equipment may be used.

An Embodiment of a Gas Monitoring System

Referring to FIG. 1, a detailed diagram of an embodiment 100 of a gas monitoring system is illustrated. The gas monitoring system 100 can be implemented to detect gases in samples provided by one or more tubing assemblies. The gas monitoring system 100 can be implemented in a variety of different locations and for different situations. In one instance, the gas monitoring system 100 can be implemented in a gas/oil field to detect methane leaks. In another instance, the gas monitoring system 100 can be implemented in an agricultural setting to monitor methane emissions.

As shown, the gas monitoring system 100 can include, but is not limited to, a gas detection system 102 and one or more tubing assemblies 104. The one or more tubing assemblies 104 can be fluidly connected to the gas detection system 102 and can be implemented to provide gas samples from one or more areas to be tested. Depending on a location and purpose for the gas monitoring system 100, the gas detection system 102 can configured with an appropriate sensor (or sensors) for detection a specific gas.

The gas detection system 102 can include, but is not limited to, a control module 110, one or more sensors 112, and an air pump 114. Typically, the gas detection system 102 can be stored in a housing designed to prevent ignition elements traveling through tubing connected to the gas detection system 102. The control module 110 can be configured to process and store data from the one or more sensors 112.

The one or more sensors 112 can be operatively connected to the control module 110. In a typical implementation, each of the one or more sensors 112 can be configured to detect a particular (or specific) gas (e.g., methane). In some instances, different types of sensors can be implemented. For instance, a first sensor may be configured to detect methane and a second sensor may be configured to detect hydrogen sulfide.

The air pump 114 can be implemented to draw in air from the one or more tubing assemblies 104. For instance, the air pump 114 can create a suction vacuum in the one or more tubing assemblies 104 to bring air from areas to be monitored to the sensor 112. Generally, a single air pump can be implemented, but embodiments are contemplated where two or more air pumps can be implemented for a single gas detection system 102. Although an air pump is described, it is to be appreciated that other means for creating a suction vacuum can be implemented without exceeding a scope of the present invention. For instance, there are other means of aspirating. For example, bottled compressed air can be used to create a vacuum to create suction and draw in air samples. As can be appreciated, this might be done in really cold temperatures if a typical air pump may not work. The bottled compressed air means can be implemented with no electric power.

In some embodiments, the gas detection system 102 can further include a manifold 116 or similar device when multiple tubing assemblies are implemented. The manifold 116 can be configured to provide the gas detection system 102 with samples from each of the tubing assemblies 104 at predetermined intervals such that the control module 110 can determine where the sample is coming from and correlate test results with a location of the sample.

The control module 110 can generally include a processor 120, random access memory 122, a nonvolatile storage (or memory) 124, and a network interface 126. The control module 110 can further include an interface for each of the one or more sensors 112 and the air pump 114. The processor 120 can be a single microprocessor, multi-core processor, or a group of processors. The random-access memory 122 can store executable code as well as data that may be immediately accessible to the processor 120, while the nonvolatile storage 124 can store executable code and data in a persistent state. The network interface 126 can include hardwired and wireless interfaces through which the control module 110 can communicate with other devices and/or networks. In some embodiments, more than one control module 110 can be implemented.

Typically, the control module 110 can be any type of computing device including, but not limited to, a personal computer, a server, a programmable logic controller, a game console, a smartphone, a tablet, a netbook computer, or other computing devices. In one embodiment, the control module 110 can be a distributed system wherein computing functions are distributed over several computers connected to a network. The control module 110 can typically have a hardware platform and software components.

The one or more tubing assemblies 104 can be fluidly connected to the gas detection system 102. More specifically, the one or more tubing assemblies 104 can be fluidly connected to the air pump 114 and the at least one sensor 112.

Figure 2:
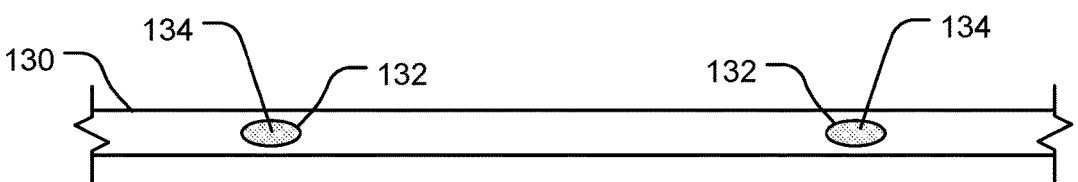
FIG. 2 is a close-up sectional view of a tubing assembly according to one embodiment of the present invention.

Referring to FIG. 2, a close-up view of a section of a tubing assembly 104 is illustrated. Each of the one or more tubing assemblies 104 can include at least one tube 130 having at least one inlet 132. Typically, the inlet 132 can include a filter 134. In one embodiment, the inlets 132 can typically include a waterproof membrane as the filter 134 to help keep moisture, debris, dust, and other liquids out of the tubes 130. In one example, a waterproof membrane similar to those provided by GORETEX® can be implemented as a filter. As can be appreciated, the waterproof membrane 134 can help ensure that only gases pass through the tubes 130 to the gas detection system 102. In a typical implementation, the tubes 130 can be located proximate an area to be monitored. Depending on a location and number of inlets 132, and end or predetermined section of the tubes 130 can be located proximate the area to be monitored.

Figure 5:
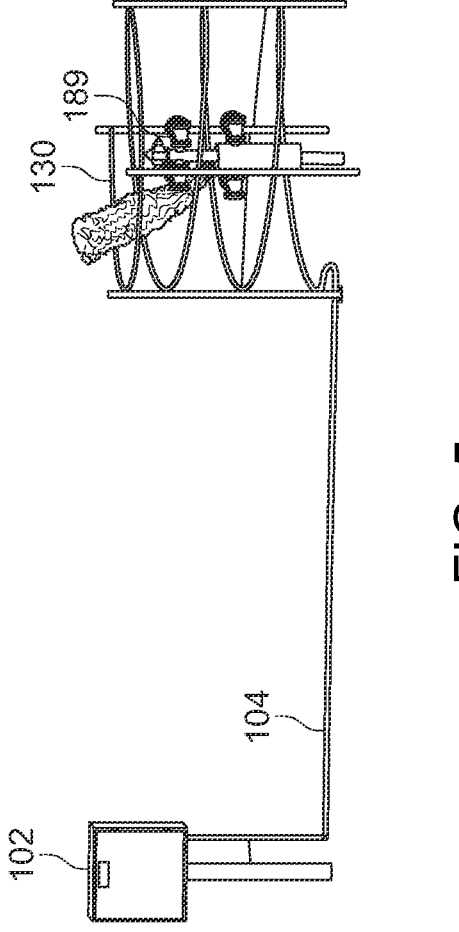
FIG. 5 is a detailed diagram of one example of a tubing assembly according to one embodiment of the present invention.

Typically, the one or more tubing assemblies 104 can be configured to best capture a gas being monitored (e.g., methane leaks). For instance, one tubing assembly may include a tube 130 coiling around an area to be monitored where the tube 130 may include several inlets 132 located along a length of the tube 130, as shown in FIG. 5. In another instance, one tubing assembly may include a main tube 130 rising vertically above an area to be monitored with four tubes extending out horizontally from proximate a top of the main tube in four different directions. In some instances, the tubing assemblies 104 can be configured to allow inlets 132 of the tubes 130 to be located above an area being monitored to more accurately sample rising gases while keeping the inlets 132 above adverse environmental conditions (e.g., snowdrifts, standing water, high water). Typically, the tubes 130 and the filters 132 implemented in the tubing assemblies 104 can be passive and have no active mechanical elements or electricity present. As can be appreciated, this allows for the use of the tubing assemblies 104 without expensive certifications or enclosures.

Of note, the inlets 132 of the tubing 130 may require a filter for dust, debris, and moisture, and water condensation prevention. Various different mounting and positioning methods can be employed for the tubing assemblies 104 to prevent moisture from water and fluids entering the tubing assemblies 104.

Typically, the one or more sensors 112 can be fluidly connected to one or more of the tubing assemblies 104. The air pump 114 can be implemented to provide air samples to the sensors 112 via the tubing assemblies 104. The air pump 114 can be fluidly connected to one or more tubes 130 (or hoses) deployed from the gas detection system 102 and distributed to a variety of areas to be monitored. In a typical implementation, air can be continuously sampled from ported openings (e.g., the inlets 132) of the tubing 130. The air can be presented to a sensor 112 and a determination of gas content can be stored.

In some embodiments, multiple tubing runs from different locations can be connected to the gas detection system 102. The gas detection system 102 can be configured to identify zones to help determine more precisely locations of leaks. In some instances, the gas detection system 102 can incorporate electronically controlled gas valves on a manifold and routing individual zones into a single sensor (a cost saving feature). In other instances, the gas detection system 102 may incorporate multiple sensors for individually testing each tubing assembly 104. Alternatively, each of the sensors 112 may test one or more tubing assemblies 104 fluidly connected to the gas detection system 102.

Figure 3:
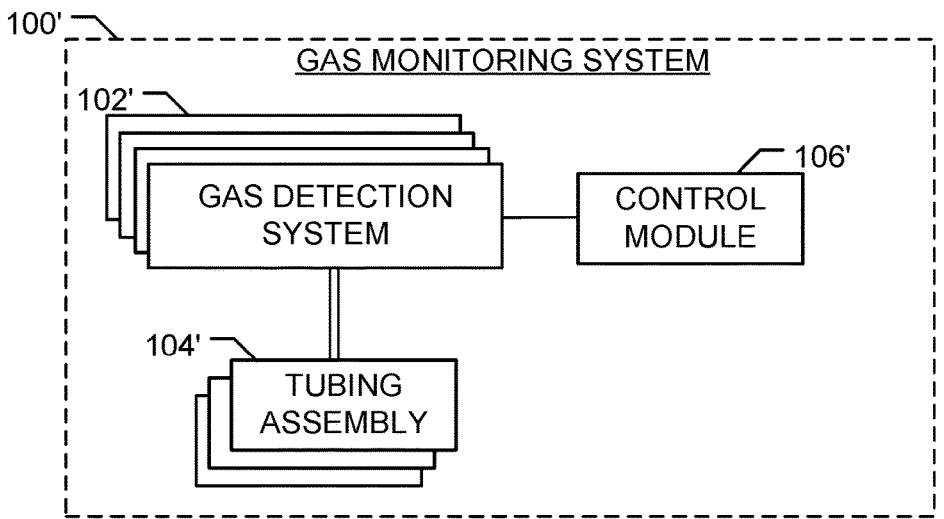
FIG. 3 is a block diagram of a gas monitoring system according to one embodiment of the present invention.

Referring to FIG. 3, a block diagram of a second embodiment 100' of a gas monitoring system is illustrated. The second embodiment gas monitoring system 100' can be implemented similar to the first embodiment gas monitoring system 100.

The gas monitoring system 100' can include, but is not limited to, a plurality of gas detection systems 102', a plurality of tubing assemblies 104', and a remotely located control module 106'. The plurality of gas detection systems 102' can be substantially similar to the first embodiment gas detection system 102. Typically, the control module included with each of the gas detection systems 102' can be connected to the remotely located control module 106'. The plurality of tubing assemblies 104' can be substantially similar to the first embodiment tubing assemblies 104. In general, the gas monitoring system 100' can operate substantially similar to the first embodiment gas monitoring system 100. The remotely located control module 106' can be configured to receive data from each of the gas detection systems 102'. The control module 106' may then send out alerts based on receiving data that indicates a leak was detected by one of the gas detection systems 102'.

Figure 4:
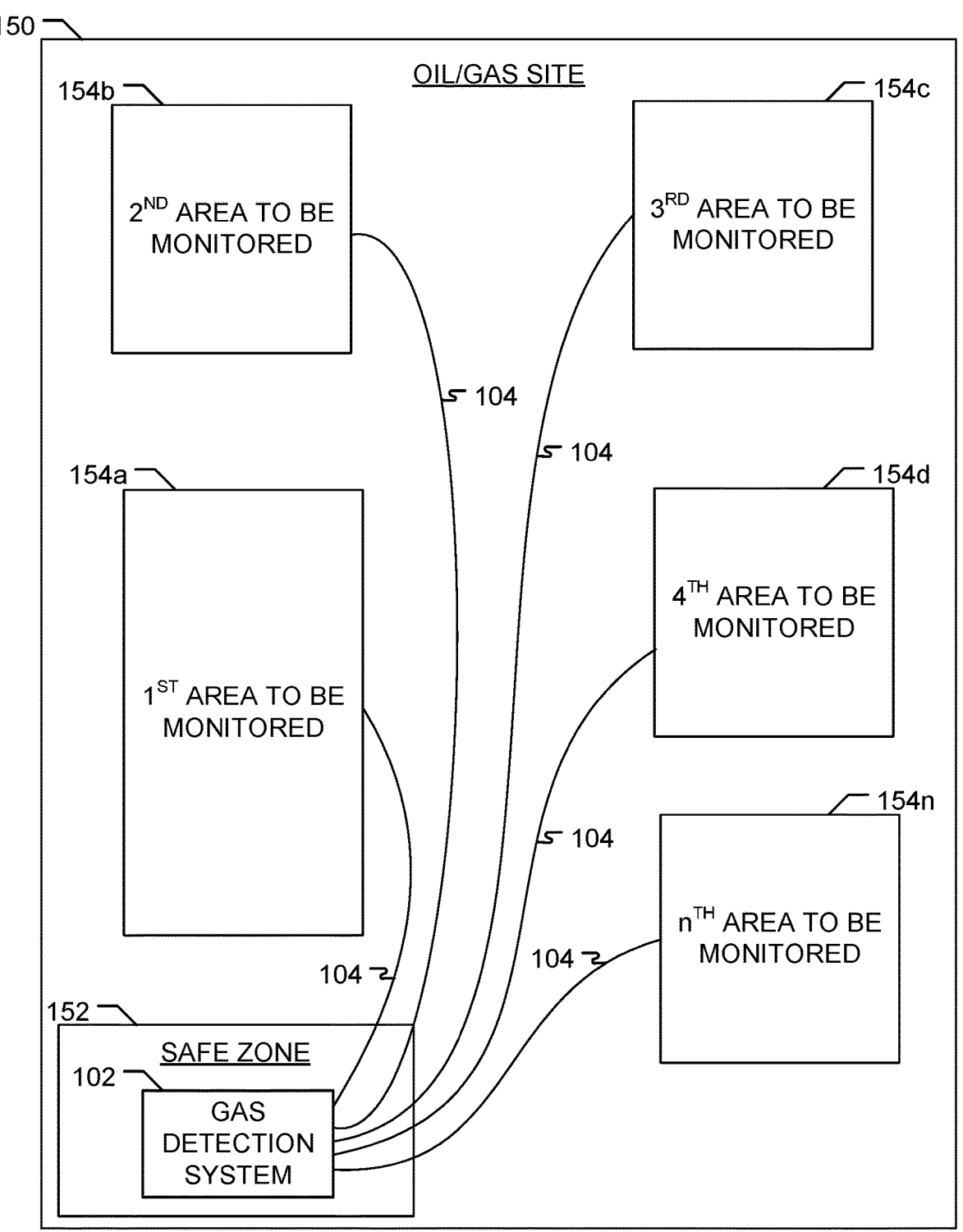
FIG. 4 is a block diagram of a gas monitoring system in an oil/gas site according to one embodiment of the present invention.

Referring to FIG. 4, a block diagram of an example implementation of the gas monitoring system 100 at an oil/gas site 150 is illustrated. The oil/gas site 150 can include, a safe zone 152 and a plurality of areas to be monitored 154a-154n. Of note, the gas detection system 102 can be located in the safe zone 152 of the oil/gas site 150. Generally, the safe zone 152 can be an area where electronics or other instruments that may ignite flammable materials can be used. The plurality of areas to be monitored 154a-154n may include various operational equipment where each of the tubing assemblies 104 may be configured to best detect fugitive leaks from the equipment. As can be appreciated, a tubing assembly for one area to be monitored may be configured differently than a tubing assembly for a second area to be monitored.

As generally shown, a tubing assembly 104 can be run from the gas detection system 102, located in a safe zone, to each of the areas to be monitored 154a-154n. In some instances, the gas detection system 102 may include the manifold 116 to allow the control module 104 to determine which area the samples are coming from. In other instances, multiple sensors 112 can be implemented to detect a particular gas in the samples from each of the areas to be monitored 154a-154n.

Referring to FIG. 5, a detailed diagram of a tubing assembly 104 (tubing 130 and inlets 132 shown) located proximate a piece of equipment 189 to be monitored and the gas detection system 102 being located in a safe zone is illustrated. More specifically, the tubing assembly 104 can be located proximate a wellhead 189 at an oil/gas site. As shown, the tubing 130 can be wrapped around the wellhead 189 in a coil. By encircling the wellhead 189, the tubing assembly 104 can increase a likelihood of detecting a gas leak. As can be appreciated, a plurality of inlets 132 (not shown) can be spaced along the section of the tubing 130 that can encircle the wellhead 189.

A First Embodiment of a Dynamic Tubing Assembly

Figure 6:
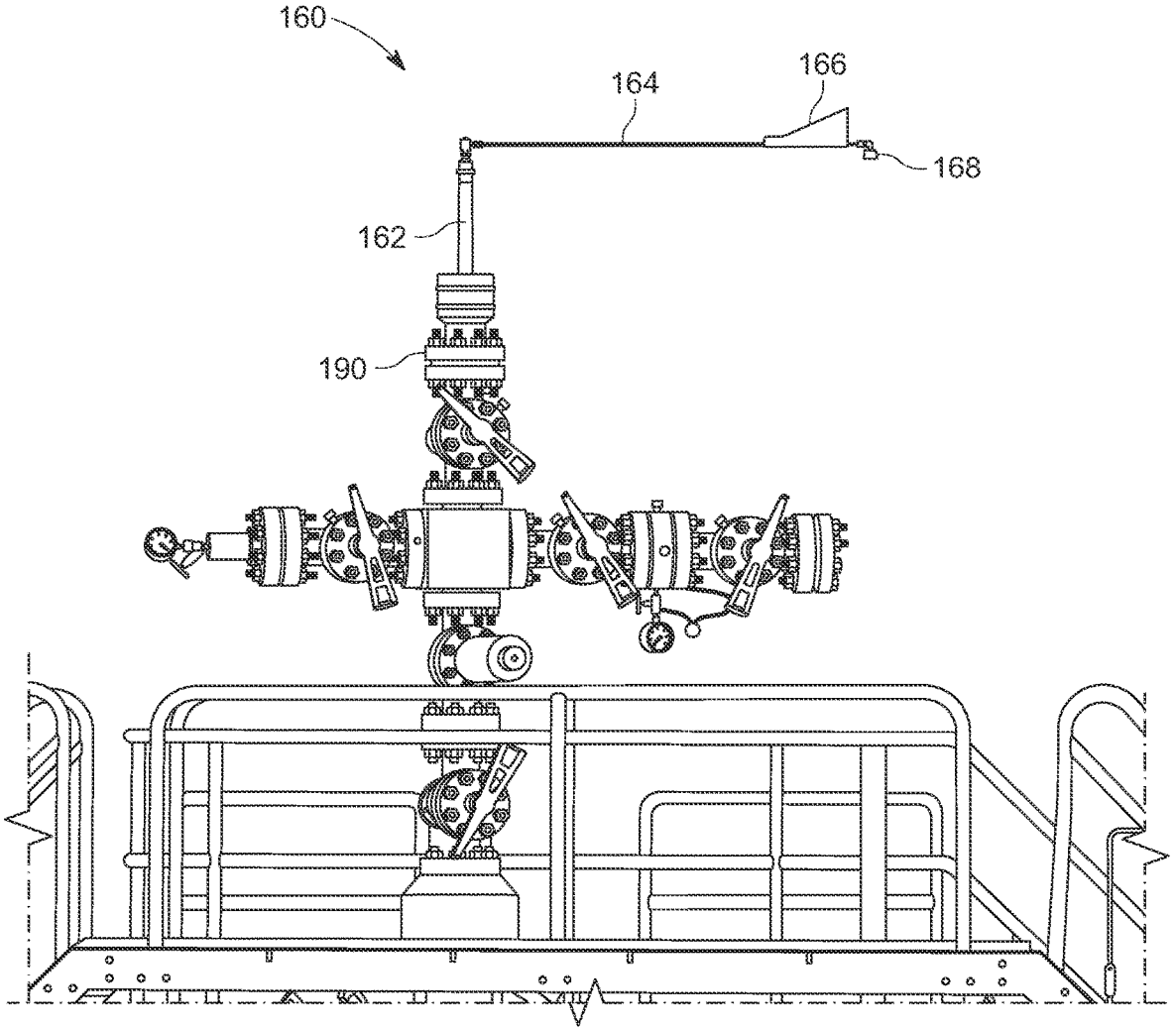
FIG. 6 is a detailed diagram of one example of a dynamic tubing assembly according to one embodiment of the present invention.

Referring to FIG. 6, a detailed diagram of a first embodiment 160 of a dynamic tubing assembly is illustrated. As shown, the dynamic tubing assembly 160 can be located proximate a piece of equipment 190 to be monitored. The dynamic tubing assembly 160 can be implemented as a vane. Of significant note, the dynamic tubing assembly 160 can be configured to rotate with the wind.

The dynamic tubing assembly 160 can include, but is not limited to, a main extension member 162, a rotating arm 164, a protrusion 166, and a sensing means 168. The main extension member 162 can generally be coupled to the piece of equipment to be monitored and extend vertically from the equipment. In some instances, the main extension member 162 may be erected with a base such that the dynamic tubing assembly 160 can be placed proximate to the piece of equipment to be monitored.

In some embodiments, the sensing means 168 can incorporate a directing member. As shown, the directing member can have a cup shaped design with the sensing means 168 adapted to be located in an interior of the cup. As can be appreciated, an open portion of the directing member can direct air towards the sensing means 168. In some instances, an orientation of the directing member can be altered to best capture any potential leaks from a piece of equipment.

In one instance, the dynamic tubing assembly 160 can be implemented with a gas sensor as the sensing means 168. In another instance, the dynamic tubing assembly 160 can be implemented with tubing having inlets similar to the previously described tubing 130 as the sensing means 168. In one example, the rotating arm 164 can be made from hollow tubing and include one or more inlets adapted to aspirate (sniff) the atmosphere where the inlets are located in the tubing. As can be appreciated, where the rotating arm 164 includes inlets for aspirating the atmosphere, a gas sensor can be included with the gas detection system 102. An additional inlet port located near a top of the main extension member 162 can be beneficial when there is no wind and the gas is predominately rising.

The dynamic tubing assembly 160 can be operatively connected to the gas detection system 102. Depending on whether the sensor or aspirating tubing is implemented as the sensing means 168, the dynamic tubing assembly 160 can be either electrically connected or fluidly connected to the gas detection system 102.

As shown, the rotating arm 164 can extend out perpendicular to the main extension member 162 and can be rotatably coupled to the main extension member 162. The protrusion 166 can extend radially from the rotating arm 164 and can generally be located at a distal end of the rotating arm 164. The protrusion 166 can be implemented as a fin to help orient the dynamic tubing assembly 160 with the wind. The sensing means 168 can be located proximate an end of the rotating arm 164. As constructed, the main extension member 162, the rotating arm 164, and the protrusion 166 can be configured as a vane with the sensing means 168 located on a distal end of the vane. When the wind is blowing, the rotating arm 164 can be configured to rotate and align the sensing means 168 in a direction that the wind is blowing.

The dynamic tubing assembly 160 can be implemented to provide an efficient sensing method. One or more known means for creating a rotating (or pivoting) connection between the main extension member 162 and the rotating arm 164 can be implemented. Embodiments are contemplated where electrical and/or mechanical means can be used to create the rotating connection. In one example, the rotating component may be an electrical signal commutator device. In another example, a rotating air joint can be implemented when tubes with inlets for aspirating the environment are used.

As previously mentioned, a gas detection sensor or an aspirating inlet can be located near an end of the rotating arm 164. In one instance, the rotating arm 164 may have an electrical wire to bring a signal from the gas sensor to the control module 110. In another instance, a gas sensing device can be mounted to end of the rotating arm 164.

In instances where gas sensors are implemented, an additional sensor may be needed near a top of the main extension member 162. As can be appreciated, any number of sensors can be attached along the rotating arm 164 at any desired interval spacing. During conditions of moving air (wind), the use of the dynamic tubing assembly 160 can allow the dynamic tubing assembly 160 to be positioned in the direction of the moving gas stream. In some instances, a vertical position of the dynamic tubing assembly 160 can be fixed at an expected optimum height. In other instances, the main extension member 162 may be extendable/collapsible to adjust a location of the rotating arm 164 in relation to the equipment being monitored.

Figure 7:
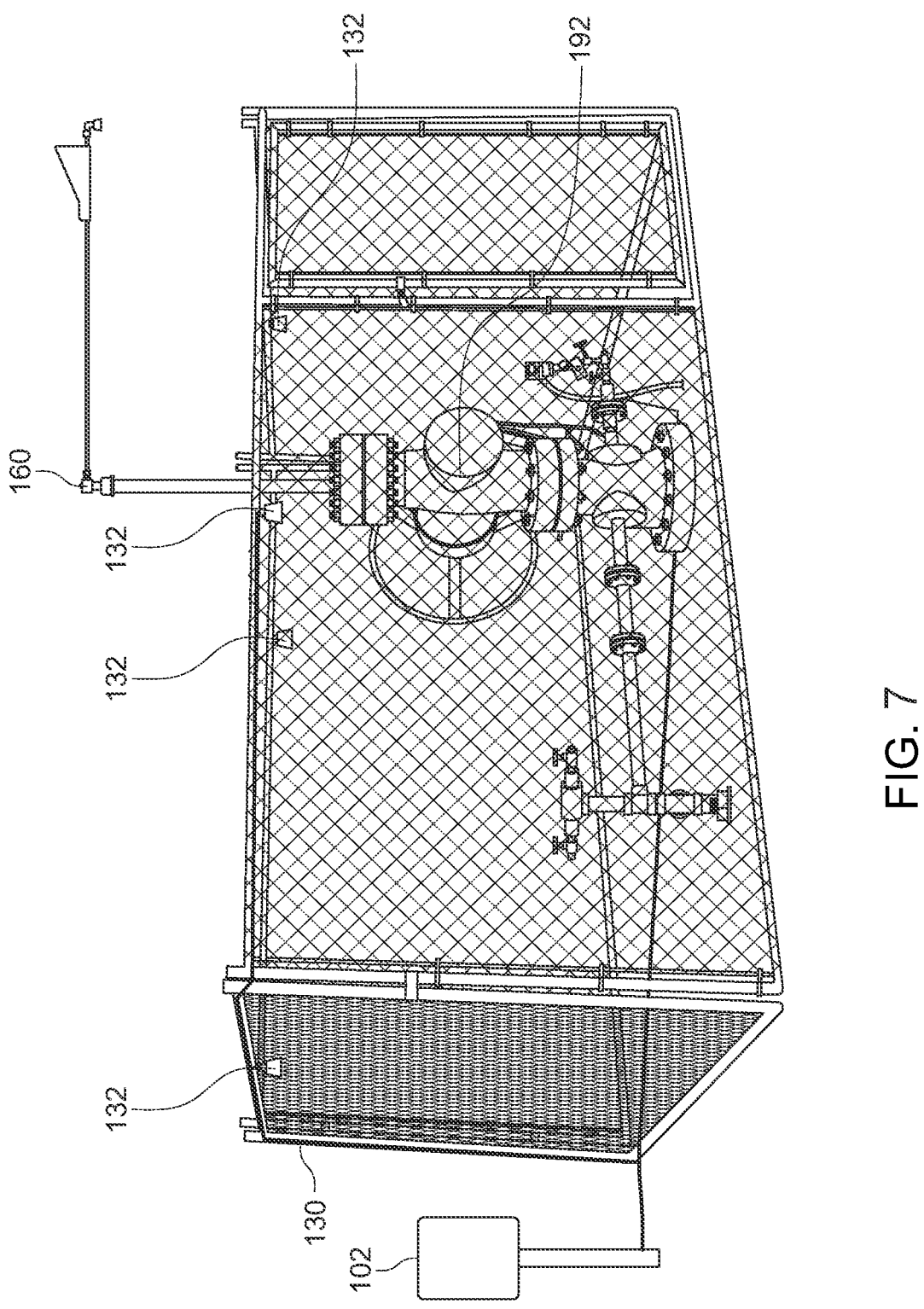
FIG. 7 is a detailed diagram of a tubing assembly and a dynamic tubing assembly according to one embodiment of the present invention.

Referring to FIG. 7, a detailed diagram of a tubing assembly 104 in combination with a dynamic tubing assembly 160 proximate a piece of equipment to be monitored is illustrated. As shown, the dynamic tubing assembly 160 can be attached to the piece of equipment and the tubing assembly 104 can be secured to a fence that encloses the piece of equipment. The tubing assembly 104 can include four inlets that are spaced equidistantly around the piece of equipment. As previously mentioned, the dynamic tubing assembly 160 can be configured to move with wind to align with the wind direction.

A Second Embodiment of a Dynamic Tubing Assembly

Figure 8:
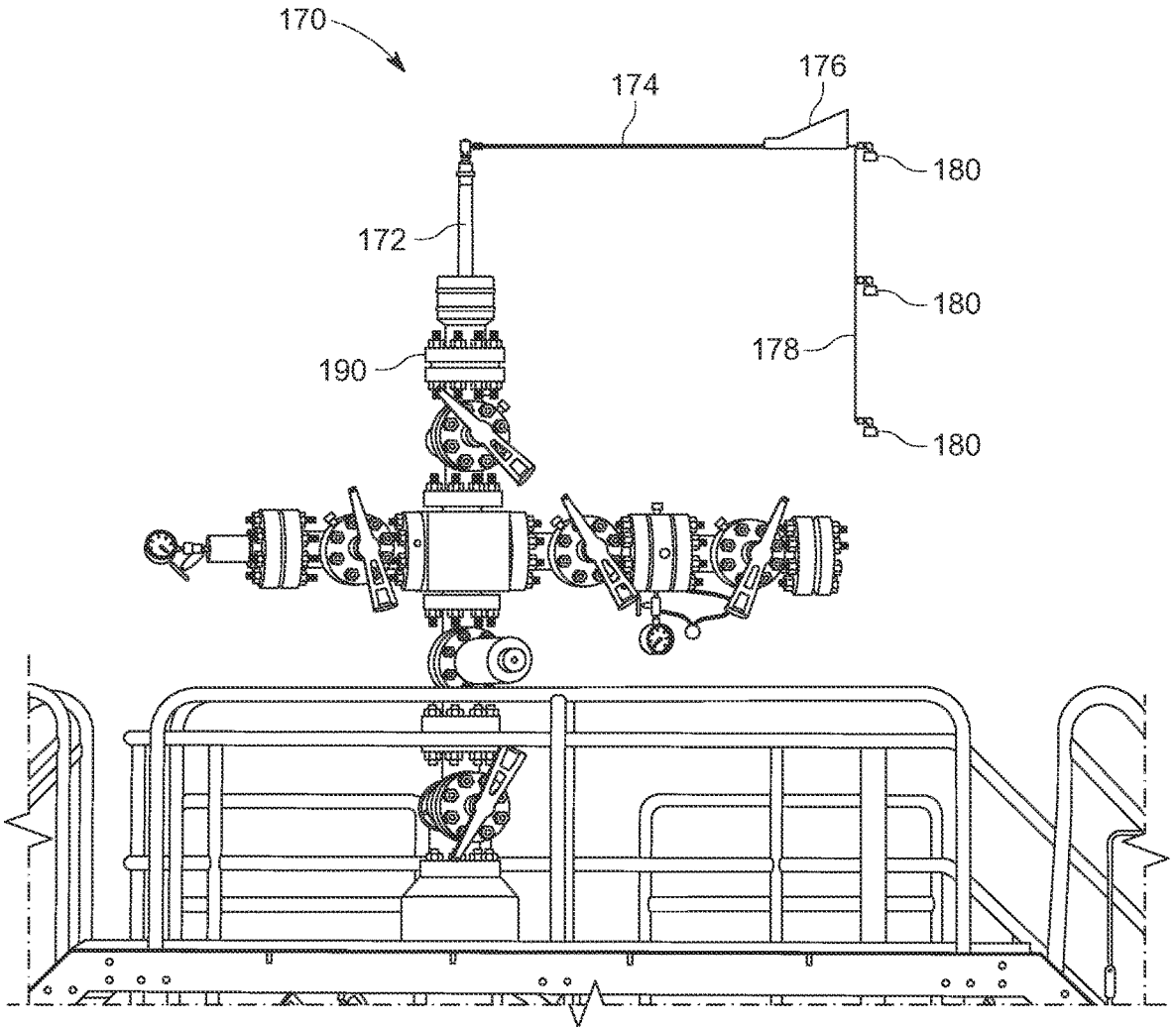
FIG. 8 is a detailed diagram of one example of a dynamic tubing assembly according to one embodiment of the present invention.

Referring to FIG. 8, a detailed diagram of a second embodiment 170 of a dynamic tubing assembly is illustrated. As shown, the second embodiment dynamic tubing assembly 170 can be located proximate a piece of equipment to be monitored. The dynamic tubing assembly 170 can be implemented as a vane to allow a distal end of the assembly 170 to rotate with the wind.

The second embodiment dynamic tubing assembly 170 can include, but is not limited to, a main extension member 172, a rotating arm 174, a protrusion 176, a second extension member 178, and a plurality of sensing means 180. The second embodiment dynamic tubing assembly 170 can be constructed similar to the first embodiment dynamic tubing assembly 160.

In one instance, the second extension member 178 can be located on a distal end of the rotating arm 174 and can extend downwards perpendicular to the rotating arm 174. In another instance, the second extension member 178 can be located on a distal end of the rotating arm 174 and can extend upwards perpendicular to the rotating arm 174. In yet other instances, the second extension member 178 may extend out at an angle between 1-90 degrees from the rotating arm 174 in an upwards or downwards direction. The second extension member 178 may be constructed of either rigid or flexible tubing. The plurality of sensing means 180 can be located along a length of the second extension member 178. As can be appreciated, the plurality of sensing locations can increase a probability that leaking gas will be detected. Of note, a length of the second extension member 178 and a number of sensing locations can be determined based on a particular piece of equipment being monitored.

A Third Embodiment of a Dynamic Tubing Assembly

Figure 9:
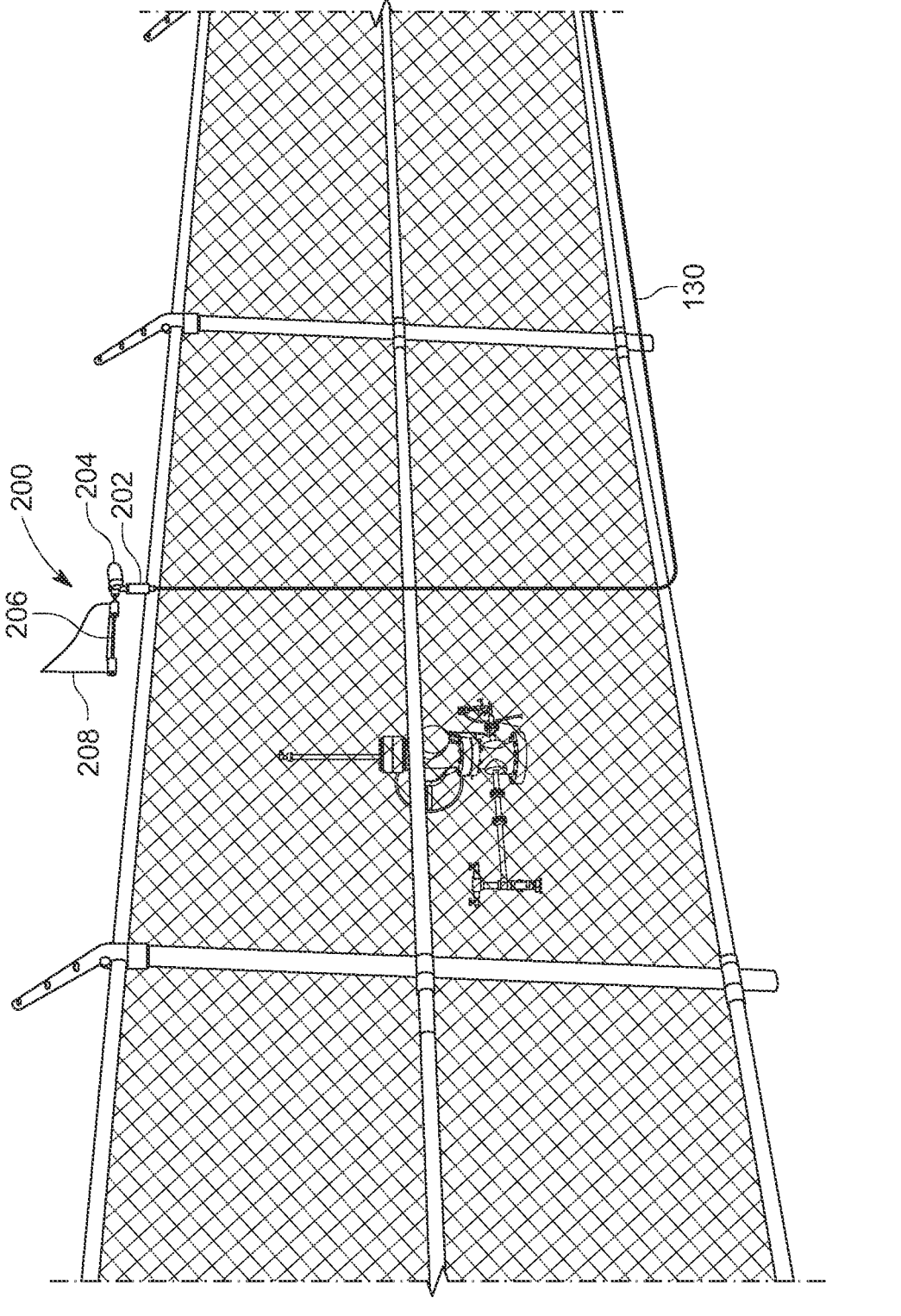
FIG. 9 is a detailed diagram of one example of a dynamic tubing assembly according to one embodiment of the present invention.

Referring to FIG. 9, a detailed diagram of a third embodiment 200 of a dynamic tubing assembly affixed to a fence surrounding an oil/gas site is illustrated. The third embodiment dynamic tubing assembly 200 can be implemented similar to a weather vane where a sensing means can be in-line with a rotating arm of the tubing assembly.

As shown, the dynamic tubing assembly 200 can include, but is not limited to, an extension member 202, a sensing means 204, a rotating arm 206, and a protrusion 208. The extension member 202 can extend vertically with a first end adapted to couple to a piece of equipment (or other object) and a second end adapted to couple to the rotating arm 206. The rotating arm 206 can be rotatably coupled to the extension member 202. The protrusion 208 can extend radially from the rotating arm 206 and can be implemented as a fin. The sensing means 204 can be located proximate the top of the extension member 202 where the rotating arm 206 rotatably couples to the extension member 202. An orientation of the sensing means 204 can be moved in-line with a wind direction as the protrusion 208 directs the rotating arm 206 with the wind direction. In some instances, a plurality of third embodiment dynamic tubing assemblies 200 can be placed around an area to be monitored. As shown, the dynamic tubing assembly 200 can be coupled to the top of a fence surrounding an area to be monitored.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A method of implementing a methane monitoring system in an oil/gas field, the method comprising:
   providing a methane monitoring system, the methane monitoring system being located in a safe zone of the oil/gas field and including:
   a control module;
   a methane sensor operatively connected to the control module; and
   an air pump;
   providing a sampling tubing with at least one inlet having a waterproof filter, the sampling tubing being fluidly connected to the methane monitoring system;
   placing a portion of the sampling tubing including the at least one inlet proximate an area to be monitored;
   sampling air from the area to be monitored; and
   determining if the sampled air from the area to be monitored has methane;
   wherein the sampling tubing is part of a dynamic tubing assembly, the dynamic tubing assembly including:
   a main extension member being vertically oriented;
   a rotating arm extending from and rotatably coupled to the main extension member; and
   a protrusion extending radially from the rotating arm.

2. The method of claim 1, wherein the dynamic tubing assembly is located proximate the area to be monitored and the at least one inlet of the sampling tubing is located approximate a distal end of the rotating arm.

3. The method of claim 1, wherein the dynamic tubing assembly further includes a second extension member coupled to a distal end of the rotating arm.

4. The method of claim 3, wherein the at least one inlet of the sampling tubing is located on the second extension member.

5. The method of claim 1, wherein the sampling tubing is fluidly connected to the air pump.

6. The method of claim 1, further including the steps of:
   continuously sampling air from the area to be monitored; and
   providing the air to the methane sensor.

7. The method of claim 1, wherein the sampling tubing includes a plurality of inlets each having a waterproof filter.

8. A method of implementing a methane monitoring system in an oil/gas field, the method comprising:
   providing a methane monitoring system, the methane monitoring system being located in a safe zone and including:
   a control module;
   at least one methane sensor operatively connected to the control module; and
   an air pump;
   providing a plurality of tubing fluidly connected to the methane monitoring system, wherein (i) each tubing of the plurality of tubing includes at least one inlet having a filter, and (ii) at least a portion of each tubing of the plurality of tubing is located proximate an area to be monitored in the oil/gas field;

placing a first tubing of the plurality of tubing proximate a first area to be monitored, an at least one inlet of the first tubing located proximate the first area to be monitored;

placing a second tubing of the plurality of tubing proximate a second area to be monitored, an at least one inlet of the second tubing located proximate the second area to be monitored;

sampling air from the first area to be monitored and the second area to be monitored; and determining if the sampled air from the first area and the second area has methane;

wherein the first tubing is part of a dynamic tubing assembly, the dynamic tubing assembly including:

a main extension member being vertically oriented;

a rotating arm extending from and rotatably coupled to the main extension member; and a protrusion extending radially from the rotating arm.

9. The method of claim 8, wherein the second tubing includes a plurality of inlets each having a filter, the plurality of inlets spaced equidistantly around the second area to be monitored.

10. The method of claim 8, wherein the filter is a waterproof membrane.

11. The method of claim 8, wherein the air pump provides a suction vacuum in the plurality of tubing.

12. The method of claim 8, wherein the methane monitoring system further includes a manifold adapted to present sampled air to the at least one methane sensor from the first area to be monitored and the second area to be monitored in intervals.

13. The method of claim 8, wherein the methane monitoring system further includes at least two methane sensors operatively connected to the control module, a first methane sensor adapted to receive sampled air from the first area to be monitored and the second methane sensor adapted to receive sampled air from the second area to be monitored.

14. A method of implementing a methane monitoring system in an oil/gas field, the method comprising:

providing a methane monitoring system, the methane monitoring system being located in a safe zone of the oil/gas field and including:

a control module;

a methane sensor operatively connected to the control module; and an air pump;

providing a dynamic tubing assembly operatively connected to the methane monitoring system, the dynamic tubing assembly including:

a main extension member being vertically oriented;

a rotating arm extending from and rotatably coupled to the main extension member;

a protrusion extending radially from the rotating arm; and at least one inlet fluidly connected to the methane monitoring system;

placing the dynamic tubing assembly proximate an area to be monitored;

sampling air from the area to be monitored; and determining if the sampled air from the area to be monitored has methane.

15. The method of claim 14, further including the steps of:

providing a sampling tubing with at least one inlet having a waterproof filter, the sampling tubing being fluidly connected to the methane monitoring system;

placing a portion of the sampling tubing including the at least one inlet proximate a second area to be monitored;

sampling air from the second area to be monitored; and determining if the sampled air from the second area to be monitored has methane.

16. The method of claim 14, further including the steps of:

providing a second dynamic tubing assembly operatively connected to the methane monitoring system, the second dynamic tubing assembly including:

a main extension member being vertically oriented;

a rotating arm extending from and rotatably coupled to the main extension member;

a protrusion extending radially from the rotating arm;

a second extension member located on a distal end of the rotating arm and extending parallel to the main extension member from the rotating arm; and at least one inlet fluidly connected to the methane monitoring system.

17. The method of claim 16, wherein the at least one inlet is located on the second extension member.

\* \* \* \* \*